Jan. 20, 1925.

M. B. JACKSON

CHANGE SPEED GEARING

Filed July 27, 1923 — 5 Sheets-Sheet 1

INVENTOR
M. B. Jackson
BY J. Edward Maybee
ATTY.

Jan. 20, 1925.

M. B. JACKSON

CHANGE SPEED GEARING

Filed July 27, 1923 — 5 Sheets-Sheet 2

1,523,648

INVENTOR.
M. B. Jackson.
BY J. Edward Maybee.
ATTY.

Jan. 20, 1925.

M. B. JACKSON 1,523,648

CHANGE SPEED GEARING

Filed July 27, 1923

INVENTOR.
M. B. Jackson.
BY J. Edward Maybee.
ATTY.

Patented Jan. 20, 1925.

1,523,648

UNITED STATES PATENT OFFICE.

MAUNSELL B. JACKSON, OF TORONTO, ONTARIO, CANADA.

CHANGE-SPEED GEARING.

Application filed July 27, 1923. Serial No. 654,160.

*To all whom it may concern:*

Be it known that I, MAUNSELL B. JACKSON, of the city of Toronto, in the county of York, Province of Ontario, Canada, a subject of the King of Great Britain, have invented certain new and useful Improvements in Change-Speed Gearing, of which the following is a specification.

This invention relates to change speed gearing and more particularly to that type used in automobiles for changing the gear ratio between the engine and the transmission shafts and for reversing the direction of rotation of the latter relative to the former and my object is to provide apparatus of this character which may be easily operated, without danger of stripping or clashing the gear teeth and in which the various gear ratios are automatically and successfully attained by the operation of a lever working in a single vertical plane.

I attain my objects by means of the constructions hereinafter more fully described and illustrated in the accompanying drawings in which

Fig. 8 a cross section on the line 8—8 in Fig. 2;

Fig. 15 a plan view of the same; and

In the constructions hereinafter described the various parts for operating the different mechanisms for obtaining the high, intermediate and low gear ratios are indicated by letters of reference $h$, $i$ and $l$ respectively. Similar parts in the different mechanisms have the same reference numeral after their reference letter so that the letter gives the key to the specific gear ratio mechanism the part is associated with and the numeral indicates the part.

1 is the crank shaft of an engine; 2 is the transmission shaft which is alined with the shaft 1 and is adapted to be connected to the driving wheels of a vehicle by any suitable driving connections; 3 is a countershaft, and 4 is the transmission casing in which the transmission shaft and countershaft are journalled. To the rear end of the crankshaft 1 a clutch is secured so that the latter also serves as a flywheel. The clutch comprises the clutch members 6, $h^1$, $l^1$ and $i^1$, the clutch rings $h^2$, $l^2$ and $i^2$, the clutch disks $h^3$, $l^3$ and $i^3$ and the annulus 7 (see Fig. 2). The clutch member 6 is provided with teeth adapted to mesh with the pinion of an electric starting device (not shown) and also adapted for another purpose hereinafter described. Bolts 5 secure this clutch member to a flange formed on the crankshaft 1 and bolts 8 passing through the holes formed in the clutch members and the annulus 7 hold these parts together. The clutch members $h^1$, $l^1$, and $i^1$ are annular and at one side of each member is formed an annular recess 9. The outer and inner walls of the recesses of the members $h^1$, $l^1$ and $i^1$ are adapted to engage the peripheries and the inner surfaces of the clutch rings $h^2$, $l^2$ and $i^2$ respectively, whereby the latter may be moved longitudinally relative to the clutch members. Bolts 10 passing through holes formed in the clutch members and rings form a driving connection for the latter and guides on which they slide.

The clutch disks $h^3$, $l^3$ and $i^3$ are splined on the transmission shaft 2 and sleeves $l^4$ and $i^4$ respectively, so that the disks may be axially moved thereon. The clutch faces of the disks $h^3$, $l^3$ and $i^3$ lie between the adjacent clutch faces formed on the clutch rings $h^2$, $l^2$ and $i^2$ and on the clutch members 6, $h^1$ and $l^1$ respectively, the clutch rings are normally held out of engagement with the disks by means of the springs 11 disposed on each bolt 10. One end of each spring 11 engages a clutch ring and the other end engages the adjacent clutch member. From the above description it is evident that any one of the clutch disks may be given a driving connection with the corresponding clutch member by moving the clutch ring for that disk, against the pressure of its springs 11, towards its co-operating clutch member to frictionally engage the clutch faces of the disk between them. The means for accomplishing this will hereinafter be described.

The sleeve $i^4$ is journalled in a bushing 12 carried by the flanged bearing 13 which is secured to a transverse wall 14 formed in the transmission casing 4. In this sleeve is journalled the sleeve $l^4$ in which is journalled one end of the transmission shaft 2. The other end of this shaft is journalled in a bearing 15 carried by the rear end 4$^a$ of the casing 4, which end is removably connected to the casing. On the ends of the sleeves $i^4$ and $l^4$, which are remote from the disks $i^3$ and $l^3$, are formed or secured the pinions $i^5$ and $l^5$ respectively, which are meshed with the gears 16 and 17 respectively. These gears are held from axial movement on the countershaft 3 and are journalled thereon, preferably by means of ball bearings. To give the gears a driving connection with the countershaft, the following construction is provided. The gears 16 and 17 are provided with ratchet teeth adapted to engage the ratchet teeth formed on the collars 18 and 19 respectively. These collars are splined on the countershaft and are adapted to be moved longitudinally thereon so that the ratchet teeth of each collar may be brought into engagement with the ratchet teeth on the adjacent gear as hereinafter described. To normally hold the ratchet teeth on the collars out of engagement with the ratchet teeth on the gears the following construction is provided. The collars are provided with transverse pins 20 adapted to pass through slots 21 formed in the countershaft which is hollow. Plungers 22 slidably fitted in the bore of the hollow countershaft engage the pins 20. A spring 23, having its ends in engagement with the plungers, tends to maintain the pins 20 against the remote ends of the slots 21 and the ratchet teeth of the collars 18 and 19 out of mesh with the ratchet teeth of the gears 16 and 17. With this arrangement the pinions $i^5$ and $l^5$ are always in mesh with the gears 16 and 17 respectively so that should the disks $i^3$ or $l^3$ drag against the clutch faces of their clutch rings or clutch members, the gears will be rotated on the countershaft but no driving connection therewith will be established.

The countershaft is adapted to be geared to the transmission shaft as follows. A pair of pinions 24 and 25 are keyed on the countershaft 3 (see Figs. 2 and 6), the latter pinion being meshed with an idler pinion 26 journalled in the rear end 4$^a$ of the casing 4. A gear 27 splined on the transmission shaft 2 is adapted to be moved longitudinally thereon whereby the gear may be meshed with either the pinion 24 or the idler pinion 26. The pinion 24 is adapted to rotate the gear 27 in one direction, and thus the transmission shaft 2, to drive the vehicle in a forward direction when it is travelling on either low or intermediate speeds; and the idler pinion 26 is adapted to rotate the transmission shaft in the opposite direction thus reversing the direction of the vehicle. The pinions 24 and 26 are spaced sufficiently far apart to permit the gear 27 to be positioned between them and not in mesh with either, thus forming a neutral position for the gear in which the transmission shaft will not be driven by either of the pinions. To enable the gear 27 to be shifted into any one of its three positions as mentioned above I provide the following construction. On the gear I form a hub provided with a peripheral groove 28 adapted to receive the forked ends of a shifter arm 29 carried on a shifter rod 30. This rod is slidably mounted in holes 31 and 32 formed in the casing 4. To actuate the shifter rod I provide the following means. A lever 33 is secured to a transverse shaft 34 rotatably mounted in a housing 35 which is secured to the top of the casing 4. The housing also serves to cover an opening formed in the top of the casing and through this opening passes a finger 36 secured to the shaft 34. The finger is formed with a rounded end adapted to engage the adjacent sides of a pair of lugs 37 formed on the shifter arm hub 29$^a$ which is secured to the shifter rod 30. It will be noted that the gear 27 is in its neutral position relative to the pinions 24 and 26 when the lever 33 is in the upright position shown in full lines in Figs. 2 and 6, and it is obvious that when the lever is pushed forward to the position shown in dotted lines indicated at R the gear 27 will be slid along the transmission shaft into mesh with the reverse pinion 26. It is also evident that should the lever 33 be swung backward to the dotted position indicated at F the gear 27 will be meshed with the pinion 24. To ensure the driver of the vehicle knowing when the gear 27 is in one of the desired positions, the shifter rod 30 is provided with three indentations 38 adapted to be engaged by a spring actuated pin 39 suitably carried in a hole formed in the casing 4 which hole communicates with the hole 32. The pin 39 is formed with a round nose which is adapted to lock the shifter rod from accidental movement and is adapted to ride over the sides of the indentations when force is applied, by means of the lever 33, to the shifter rod.

The transmission shaft 2 may be driven at different gear ratios by the operation of the clutch disks $h^3$, $l^3$ and $i^3$ as described, the disk $h^3$ being adapted to form a direct drive for the transmission shaft, whereby the latter is driven at the same speed as the engine shaft 1, the disks $l^3$ and $i^3$ being adapted to form part of the drive connection between the clutch and the transmission shaft at a low and an intermediate speed respectively, relative to the speed of the engine shaft. Before the drive connection between the low or intermediate gear disks and the transmission shaft is complete it is necessary to form, by means of either one of the collars 18 and 19, a driving connection between the countershaft 3 and one of the gears 16 and 17, as hereinbefore described and to also shift the gear 27 on the transmission shaft to mesh with either the pinion 24 or the reverse pinion 26, which pinions are driven by the countershaft as hereinbefore described.

To actuate any one of the clutch rings $h^2$, $l^2$ and $i^2$ to frictionally engage its clutch disk $h^3$, $l^3$ or $i^3$ respectively and to simultaneously move the collar 18 or 19 to drive the countershaft, I provide means for supplying fluid under pressure to actuate these parts, which pressure fluid is controlled by means of a manually operated valve.

In the clutch members $h^1$, $l^1$ and $i^1$ are formed, by means of annular grooves, the fluid chambers $h^6$, $l^6$ and $i^6$ respectively which communicate, behind the clutch rings $h^2$, $l^2$ and $i^2$, with the recesses 9 formed in these clutch members. In the annulus 7 and the clutch members are formed the fluid passages $h^7$, $l^7$ and $i^7$ which are radially disposed in the annulus and have their outer ends axially disposed in the annulus and have their outer ends axially directed to form passages through the clutch members $h^1$, $l^1$ and $i^1$, these passages terminate in the clutch members 6, $h^1$ and $l^1$ to form outlet or exhaust passages for the fluid chambers $h^6$, $l^6$ and $i^6$ respectively. (See Figs. 2, 8, 9, 10, 11 and 12). In opposite sides of the clutch members $h^1$, $l^1$ and $i^1$ are formed ports $h^8$, $l^8$, $i^8$; and $h^9$, $l^9$ and $i^9$ which communicate with the opposite ends of the passages $h^7$, $l^7$ and $i^7$ respectively, and each pair of the ports $h^8$ and $h^9$; $l^8$ and $l^9$; and $i^8$ and $i^9$ communicate with one another by means of one or more openings 40, 41 and 42 respectively. These openings also communicate, by means of one or more openings $40^a$, $41^a$ and $42^a$, with the chambers $h^6$, $l^6$ and $i^6$ respectively. To permit the fluid to escape from the chambers $h^6$, $l^6$ and $i^6$ into the clutch casing 43, which is suitably secured to the forward end of the transmission casing 4, the exhaust openings $40^b$, $41^b$ and $42^b$ are formed in the clutch members 6, $h^1$ and $l^1$ respectively and these openings communicate with the outer or exhaust ends of the passages $h^7$, $l^7$ and $i^7$ respectively. From the above description it will be noted that the ports $h^8$, $l^8$ and $i^8$, openings 40, 41 and 42, and $40^a$, $41^a$ and $42^a$ form communicating means with the inlet ends of the passages $h^7$, $l^7$ and $i^7$ respectively to permit fluid to enter the fluid chambers and that the same openings, the ports $h^9$, $l^9$ and $i^9$, the exhaust ends of the passages $h^7$, $l^7$ and $i^7$ and the exhaust openings $40^b$, $41^b$ and $42^b$ form communicating means with the fluid chambers to permit the fluid to escape therefrom.

From this it follows that the fluid entrance into or exhaust from each fluid chamber may be controlled by opening and closing the inlet or exhaust port. This is accomplished by providing each of the passages $h^7$, $l^7$ and $i^7$ with a slidably mounted piston valve 44 adapted to be moved longitudinally in the passage to close off either port and open the other port.

To normally drain the fluid chambers $h^6$, $l^6$ and $i^6$ the springs 45 disposed on the stems 46 engage the valves 44 to yieldingly maintain the valves in position to establish the communications between the outer or exhaust ends of the fluid passages $h^7$, $l^7$ and $i^7$ and the recesses $h^9$, $l^9$ and $i^9$ respectively. The valves while in this position engage the stem $h^{10}$, $l^{10}$ and $i^{10}$, suitably carried by the annulus 7 and extending into the fluid passages, and close off the communications between the inner or inlet ends of the passages $h^7$, $l^7$ and $i^7$ and the ports $h^8$, $l^8$ and $i^8$. The springs 45 are adapted to yield against a certain fluid pressure exerted against the valves to permit any one of the latter to be moved into engagement with its stem 46 to form a communication between the pressure ends of its passage and the inlet port in that passage and to close off the exhaust port for that passage, whereby the fluid pressure may be exerted against the desired clutch ring to move it into frictional engagement with its clutch disk and thus drive the latter.

On the bearing 13 is journalled a helical gear 47 which is provided with a flange having a peripheral notch formed therein adapted to receive a pin 48 secured to the annulus 7. This pin and notch forms a drive connection for the gear 47 which is held against the side of the annulus by means of a ring 49 secured to the latter, the ring being provided with an inwardly directed rim adapted to overhang and engage the flange formed on the gear. The latter is provided with annular grooves $h^{11}$, $l^{11}$ and $i^{11}$ and passages $h^{12}$, $l^{12}$ and $i^{12}$, which passages form communications between the said grooves and the passages $h^7$, $l^7$ and $i^7$ respectively. The annular grooves also communicate with ducts $h^{13}$, $l^{13}$ and $i^{13}$ formed in the bearing 13, and these ducts communicate with passages $h^{14}$, $l^{14}$ and $i^{14}$ formed in the transverse wall 14. The pin 48 and its notch also serves to position the gear so that its passages are properly alined with their passages in the annulus.

To supply the passages with fluid I provide the rotary gear pumps 50 and 51 (see Figs. 2, 3, 4, 6 and 7), the former pump being driven by the engine shaft from the gear 47 which meshes with a helical gear on the pump shaft $50^a$, the latter pump being driven by helical gearing 52, one gear of which is secured to the transmission shaft 2 and the other to the pump shaft $51^a$. With this arrangement a supply of liquid will be provided by the pump 50 to operate the clutch when the engine is started, and the supply will be increased when the transmission shaft is rotated. In the transmission casing is formed a liquid chamber 53 having an opening formed in its upper wall through which opening the liquid, which has been previously poured into the casing, flows by means of gravity and passes through a suitably carried cylindrical screen $53^a$ into the chamber 53 which communicates by means of the passages 54 and 55 with the inlet openings of the pumps 50 and 51 respectively. The pumps are secured to the underside of this chamber and their outlet openings communicate with the passage 58 arranged longitudinally in the casing and with this passage communicates a short transverse passage 59 having a communication with a vertical passage 60. A safety valve 61 which may be of any common type is fitted to the passage 59 and is adapted to spill the liquid, when a certain pressure is reached, into the oil chamber 53.

In some instances it is desirable to prevent the pump 51, driven by the transmission shaft 2, working against the other pump 50 when the direction of the transmission shaft is reversed to that of the engine shaft. For this purpose I provide a check valve $57^a$ located in the passage 57. This check valve being adapted to only permit the pump 51 to pump fluid when the transmission shaft is driving the vehicle in a forward direction.

To control the flow of liquid from the pumps a balanced valve adapted to be operated by means of a pedal lever 63 is provided (see Figs. 1, 3, 4 and 5). In the valve body 64, secured to the side of the casing 4, is slidably mounted the hollow plunger 65 which is provided with a slot or slots 66 adapted to be brought into register with any desired one of a plurality of annular ports $h^{15}$, $i^{15}$ and $l^{15}$ formed in the valve body. The said ports communicate by means of the passages $h^{16}$, $i^{16}$ and $l^{16}$ formed in the valve body with the passages $h^{14}$, $i^{14}$, and $l^{14}$ respectively. The valve body is also provided with annular grooves 67, 58, $b^1$, 68 and 69, the first two being connected with relief openings $67^a$ and $68^a$ respectively which lead through the side wall of the casing 4 and are adapted to spill liquid from the valve into the clutch casing 43 as hereinafter more fully described. The wall of the plunger is turned down to form a plurality of annular recesses 71, 72 and 73 which are separated by the collars or shoulders 74 and 75 formed on the plunger and adapted to engage the walls of the bore of the valve body. The recess 73 normally communicates with the liquid supply groove 69, and holes $69^a$, formed in the plunger, form communications between the recess and the interior of the hollow plunger, the collar 75 being adapted to prevent the liquid in the recess 73 from passing into the relief opening $68^a$. The pressure of the liquid entering the recess 73 is equally exerted against the underside of the collar 75 and the upper side of the lower end of the plunger to provide a balanced valve. The slots 66 are formed in the collar 74 and the plunger is normally maintained, by means of a spring 76, in the high gear position shown in Fig. 4 with the slots 66 in register with the port $h^{15}$ whereby the liquid may be forced through the passages $h^{16}$, $h^{14}$, duct $h^{13}$, groove $h^{11}$, passages $h^{12}$ and $h^7$ and thus move the valve 44 to permit the liquid to be forced through the port $h^8$, openings 40 and $40^a$ and into the fluid chamber $h^6$ to act against the clutch ring $h^2$ and force it to frictionally engage the clutch disk $h^3$ and move the latter against the clutch face of the clutch member 6 and thus form a direct driving connection between the clutch and the transmission shaft 2. When the plunger is pressed down against the pressure of the spring 76 to bring the slots 66 out of register with the port $h^{15}$ the recess 71 is adapted to form a communication between the latter and the relief openings $67^a$ whereby some of the liquid may be drained out of the said port and the passages communicating therewith. This permits the spring 45 to move the valve 44 into engagement with the stem $h^{10}$ and thus re-establish the communication between the port $h^9$ and the fluid chamber $h^6$ to drain the latter into the clutch casing as hereinbefore described and thus permit the clutch ring $h^2$ to return to its normal position assisted by the springs 11 and thus the clutch disk $h^3$ will be disengaged.

It will be noted that the ports $h^8$, $l^8$, $i^8$, $h^9$, $l^9$ and $i^9$, and the openings 40, 41, 42; $40^a$, $41^a$, $42^a$; $40^b$, $41^b$ and $42^b$ are so located relative to the fluid chambers $h^6$, $l^6$ and $i^6$ that the centrifugal action of the fluid in the latter tends to force the fluid through the above ports and openings. This is accomplished by arranging the above ports and openings farther away from the centre of the clutch members than the fluid chambers, which enables the latter to be quickly and thoroughly emptied and also creates a vacuum therein which tends to draw the clutch rings to their normal position without the use of the springs 11.

The above method of centrifugally forcing the fluid from the fluid chambers is also very effective in removing any particles of dirt which have been separated from the fluid and lodged in the fluid chambers and exhaust passages.

Figures 1, 5, 13:
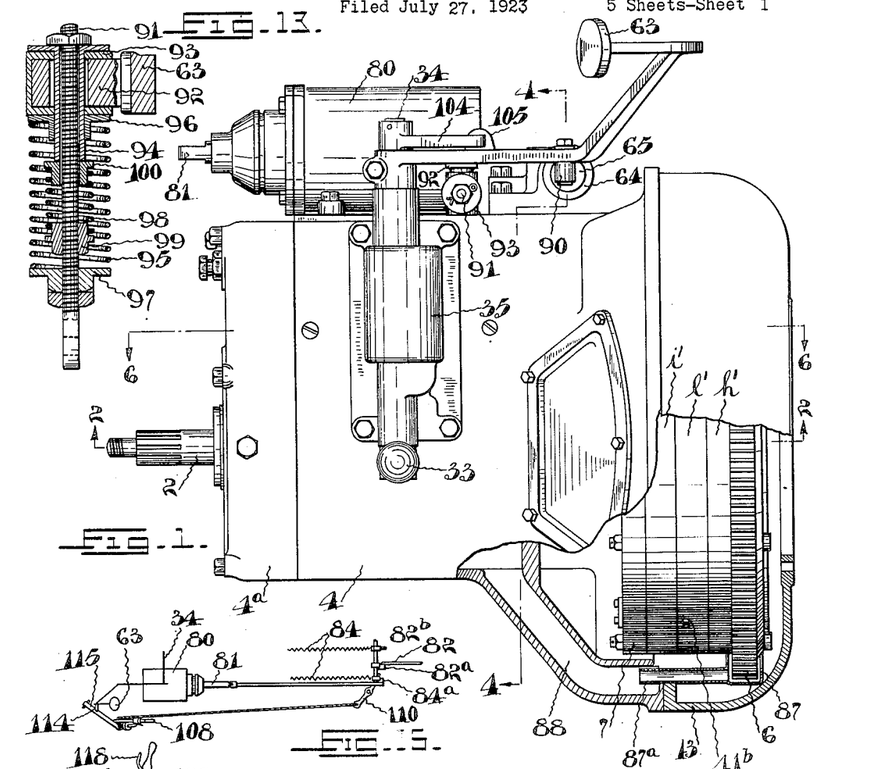
Fig. 1 is a plan view of my improved clutch and gear box, partly in section.
Fig. 5 a section on the line 5—5 in Figure 3.
Fig. 13 a sectional detail of the pedal lever springs.

At various places in the clutch members openings 79 are formed therethrough for the purpose of draining any liquid in the clutch into the clutch casing. It will readily be understood that the liquid under pressure may be directed by bringing the slots 66 into register with the port $i^{15}$ or $l^{15}$, through the various passages hereinbefore described, to form a drive connection between the clutch and the disk $i^3$ or $l^3$ and that the disk will be immediately disengaged when the plunger is moved in either direction to bring the slots 66 out of register with the port. It will be noted that the recess 71 is adapted to also drain the ports $i^{15}$ and $l^{15}$ into the relief opening $67^a$ as the plunger is moved downwardly to cause the collar 74 to uncover these ports. When the plunger is rising from its lowermost position the recess 72 is adapted to form a communication between all the ports below the collar 74 and the relief opening $68^a$ whereby these ports will be drained. To cause the supply of liquid to be passed gradually into the ports and to gradually cut off the liquid supply and thus permit the clutch disks to be operated smoothly and without any jerking effect the upper edge of the collar 74 adjacent the slot 66 is chamfered as shown in Figs. 4 and 5 to cause a gradual opening and closing of the ports.

Figures 2, 3:
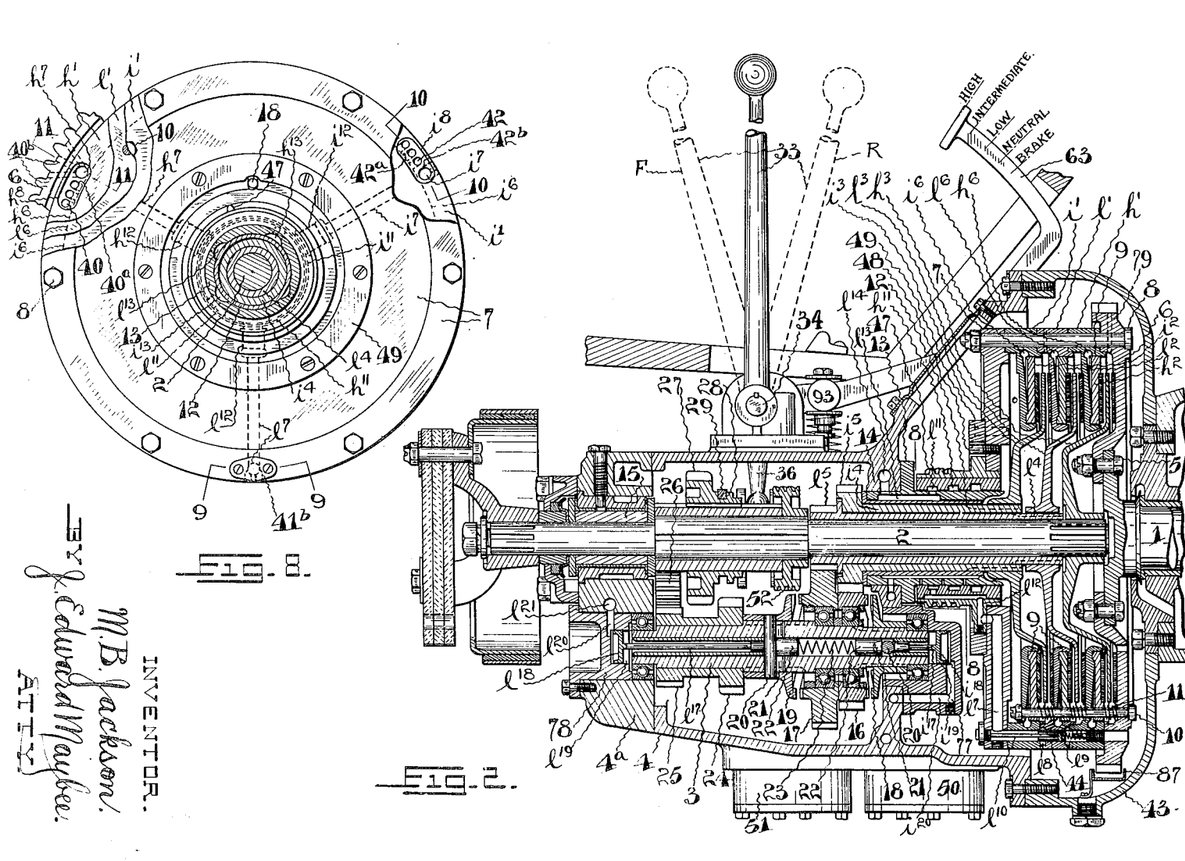
Fig. 2 a longitudinal section of the same on the line 2—2 in Fig. 1, some of the fluid passages being shown in their incorrect positions to better illustrate their communications with other fluid passages.
Fig. 3 a side elevation looking at the left hand side of Fig. 1.
Figures 3, 12:
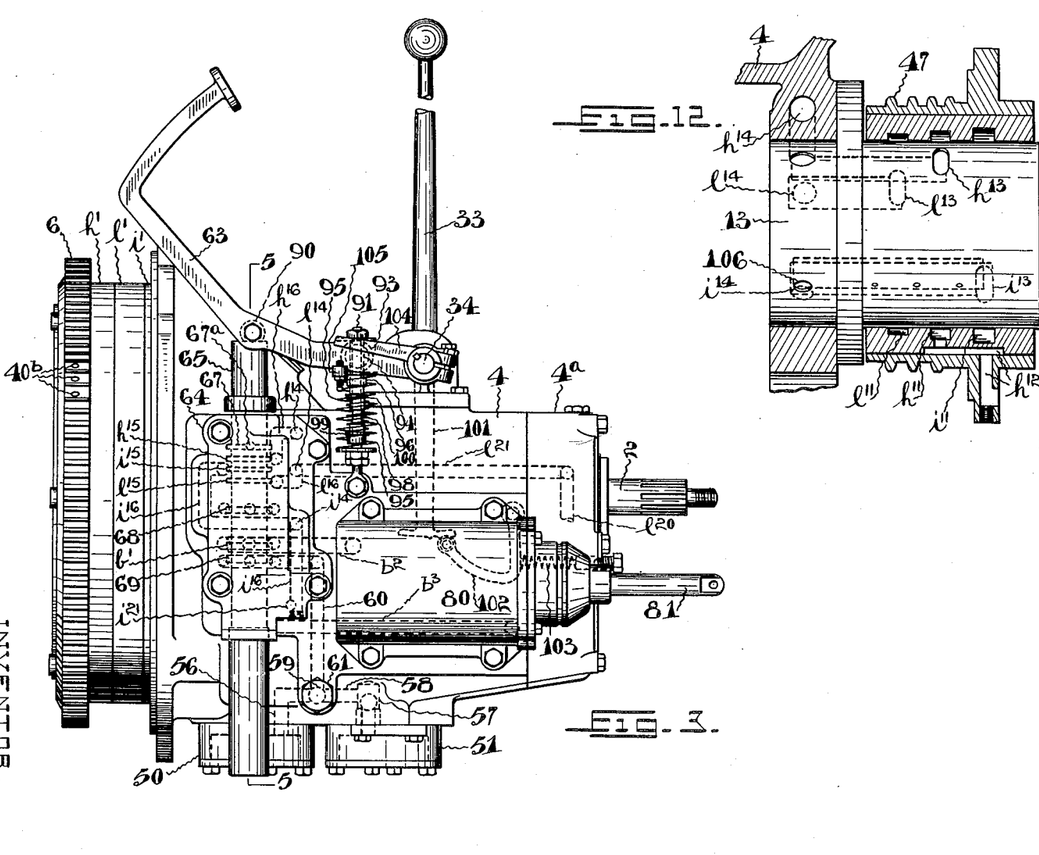
Fig. 12 an enlarged side elevation of the transmission shaft forward bearing showing the first communicating means between the stationary parts and the revolving parts.
Figure 4:
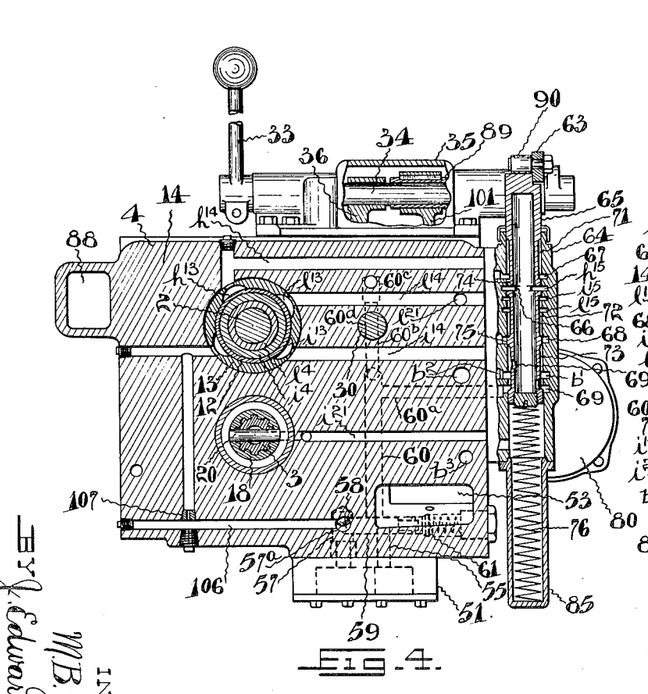
Fig. 4 a transverse section on the line 4—4 in Fig. 1.
Figures 5, 9, 10, 11:
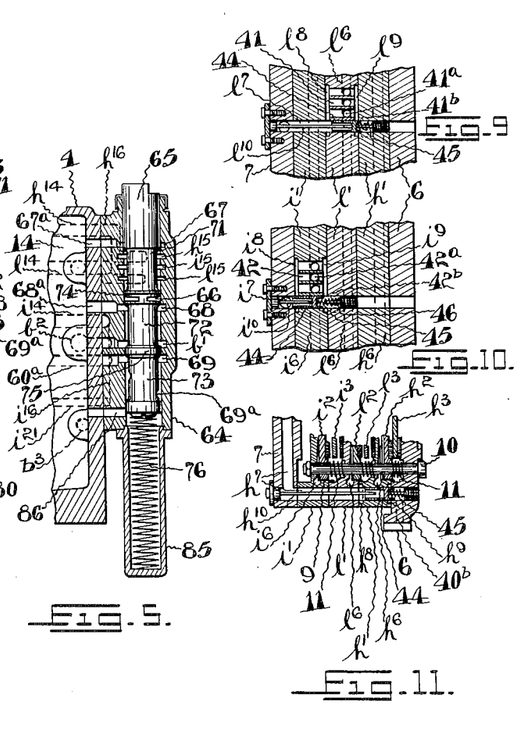
Fig. 9 a section on the line 9—9 in Fig. 8.
Fig. 10 a section on the line 10—10 in Fig. 8.
Fig. 11 a section on the line 11—11 in Fig. 8.

To simultaneously actuate either one of the collars 18 or 19 to form a drive connection between its gear 16 or 17 and the countershaft 3 when the intermediate or low speed clutch disk $i^3$ or $l^3$ is given a driving connection with the clutch, as hereinbefore described, I provide the following means (see Figs. 2, 3 and 4). The countershaft is journalled, preferably by means of ball bearings carried in a member 77, secured in the transverse wall 14, and in the rear end $4^a$ of the casing 4. Within the opposite ends of the hollow countershaft, are suitably guided the stems $i^{17}$ and $l^{17}$ of the plungers $i^{18}$ and $l^{18}$. The inner ends of these stems are adapted to engage the transverse pins 20 and the plungers are slidably mounted in the cylindrical chambers $i^{19}$ and $l^{19}$ formed respectively in the member 77 and a plug 78 fitted in the end $4^a$. The outer ends of the plunger chambers $i^{19}$ and $l^{19}$ communicate with passages $i^{20}$ and $l^{20}$ formed in the member 77 and plug 78 respectively. A passage $i^{21}$ formed in the transverse wall 14 forms a communication between the passage $i^{20}$ and the passage $i^{16}$ formed in the valve body 64. A passage $l^{21}$ formed in the rear end $4^a$ and in the casing 4 forms a communication between the passage $l^{20}$ and the passage $l^{14}$ which communicates with the valve body as hereinbefore described. From this it follows that when the slots 66 in the plunger are in register with the port $i^{15}$ the liquid from the pumps will flow through the port, passages $i^{16}$, $i^{21}$ and $i^{20}$ and into the chamber $i^{19}$ to force the plunger $i^{18}$ to axially move the collar 18 and engage the ratchet teeth thereon with the ratchet teeth on the gear 16 and thus form the drive connection between the latter and the countershaft 3 as hereinbefore described. When the plunger 65 is moved to break the communication between its slots and the above port, the latter will communicate with one of the recesses 71 or 72 to drain off sufficient liquid to permit the spring 23 to move the collar to disengage the ratchet teeth as hereinbefore described. It is obvious that when the slots 66 are in register with the port $l^{15}$ the liquid will flow through the port, passages $l^{16}$, $l^{21}$ and $l^{20}$ into the chamber $l^{19}$ to force the plunger $l^{18}$ to actuate its collar 19 in the same manner as the collar 18 is actuated.

In an ordinary vehicle having the type of change speed gears, clutch pedal and brake pedal commonly employed, when the engine stops, or it is necessary to change gears while climbing a hill, there is a great possibility of the vehicle backing down the hill. If this happens and the driver should get excited and forget to apply the brakes immediately, the chances of stopping the vehicle without an accident are very small. To prevent accidents of this nature I provide means for automatically applying the brakes to the vehicle should the engine stall and the vehicle back down a hill. For this purpose a brake cylinder 80 is secured to the side of the casing 4 (see Figs. 4, 3 and 1). A passage $b^2$ formed in the casing 4 and the valve body 64 is adapted to form a communication between the groove $b^1$, formed in the valve body as hereinbefore described, and the forward end of the interior of the brake cylinder. A vent opening $b^3$ formed in the casing 4 forms a communication between the rear end of the brake cylinder and the clutch casing to prevent any back pressure being set up in the rear end of the cylinder. In the cylinder is slidably mounted a plunger (not shown) to which the plunger rod 81 is connected. The rear end of the plunger rod 81 is connected with the brake actuating levers 83 (shown diagrammatically in Fig. 14). These levers are connected to the brake rods 82 which are connected with arms $82^a$ secured on a transverse shaft $82^b$. This shaft is suitably mounted on the underside of the vehicle chassis (not shown) so that it may be oscillated to rock the arms $82^a$, to apply or hold off the brakes. To normally apply the brakes, springs 84 connected with a suitable stationary part and with arms $84^a$ secured to the shaft $82^b$, are provided. The plunger rod 81 is connected to one of the arms $84^a$ so that a rearward movement of the former will rock the arm and thus the shaft $82^b$ to hold off the brakes. Referring to Fig. 4, it will be noted that the recess 73 normally communicates with the groove $b^1$ thus the liquid from the pump is directed through the passage $b^2$ into the forward end of the cylinder 80 thus forcing the plunger rod 81 rearwardly against the tension of the springs 84. From this it follows that should the engine and car stop or the engine stop and the car run backwards the fluid pressure drops to permit the springs 84 to apply the brake, or should the plunger 65 be depressed sufficiently to close, by means of the collar 75, the communication between the recess 73 and the groove $b^1$ (as shown in Fig. 5) the recess 72 will be brought into communication with the groove $b^1$ to permit the springs 84 to automatically force the liquid in the cylinder through the relief opening $68^a$ and apply the brakes.

From the hereinbefore described arrangement for driving the pumps 50 and 51 it will be noted that while the vehicle is travelling in a forward direction both pumps are normally pumping liquid from the liquid chamber 53 into the valve body 64 and thus into the brake cylinder 80 to hold off the brakes. It is obvious that when a vehicle, in trying to climb a hill, begins to back down the latter the traction of the rear wheels revolves the transmission shaft in the reverse direction. This also reverses the direction of the rear pump 51 and causes the latter to pump the liquid from the brake cylinder 80 into the liquid chamber 53, thus permitting the springs 84 to apply the brakes. To facilitate the automatic operation of the brake the check valve $57^a$, hereinbefore referred to, is not used when the device is applied to automobiles.

Figure 14:
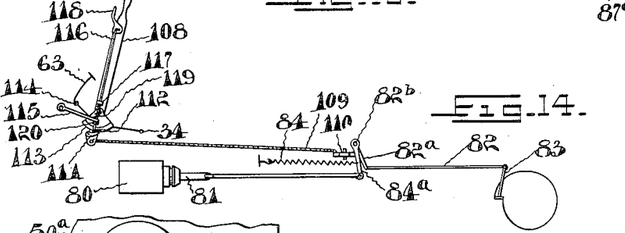
Fig. 14 a side elevation showing the brake operating mechanism, the brake actuating lever being shown diagrammatically.
Figure 16:
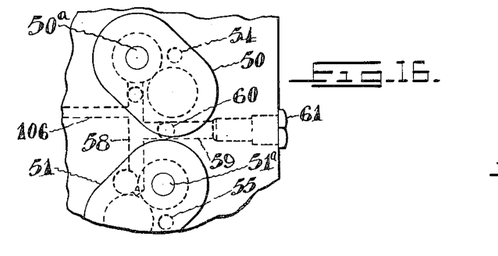
Fig. 16 a detail in plan of part of the underside of the casing showing the fluid passages from the pumps.

To hold off the brakes when it is desired to move the vehicle, without starting the engine to supply fluid to the brake cylinder, I provide an auxiliary manually operated brake lever 108 (see Figs. 14 and 15). This lever is connected by means of a flexible connection 109 with a lever 110, the latter being adapted to engage one of the arms $84^a$ to rock the transverse shaft $82^b$ against the tension of the springs 84. A dog 111 pivoted on the lever 108 is adapted to engage a shoulder 112 formed on the underside of a quadrant 113 to releasably lock the lever in position for holding the brakes off. This dog is adapted to be positioned for engagement with the shoulder 112 by the following means. A rod 116 suitably secured to the dog is guided in a lug 117 on the side of the lever 108 and is pivotally connected with a pivoted hand grip 118 connected at the upper end of the lever. To tend to hold the dog out of engagement with the shoulder 112 a spring 119, disposed on the rod 116, engages a collar 120 formed on or secured thereto and the lug 117. With this arrangement when it is desired to hold off the brake the lever 108 is moved to release the tension of the springs 84 from the brake rods 82 and to also position the dog for engagement with the shoulder 112. The hand grip is then rocked relative to the lever and against the spring 119 to move the dog into engagement with the shoulder, the springs 84 tending to maintain the parts in their locked positions.

To prevent the brakes being held off by the lever 108 when it is desired to apply them by the operation of the foot pedal lever 63, as hereinbefore described, the latter is provded with a projection 114 adapted to engage one end of a lever 115 to rock the latter to throw the dog out of engagement with the shoulder 112. This is accomplished by arranging the end of the lever 115, that is remote from the projection 114, to engage the collar 120 on the rod 116 to depress the latter and thus assist the spring 119 to disengage the dog from its shoulder. Preferably the projection 114 and the lever 115 are so arranged relative to one another that the former will engage the latter when the pedal lever 63 is being pushed downwardly into neutral position.

From the description hereinbefore mentioned it is obvious that by moving the lever 33 to its neutral position the driving connection between the countershaft 3 and the transmission shaft 2 will be disconnected, but as the pedal lever 63 is normally in high gear position it is also necessary to provide means for automatically relieving the fluid supply from the pump to the portion of the clutch controlling the direct drive, otherwise the engine shaft remains in direct connection with the transmission shaft, when the lever 33 is in neutral position. This fluid supply relief means is also adapted to automatically apply the brakes, as hereinbefore described, when the lever 33 is in neutral position.

Figure 6:
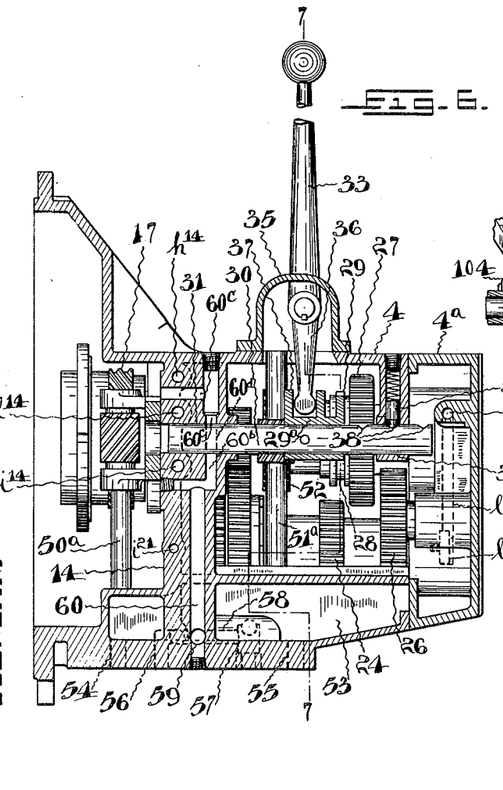
Fig. 6 a longitudinal section on the line 6—6 in Fig. 1.

The main feed passage 60 is formed with a branch 60$^b$, see Fig. 6, which leads into the hole 31. A passage 60$^c$ located directly opposite the passage 60$^b$, forms a communication between the hole 31, and the clutch casing 43. In the shifter rod is formed a transverse opening 60$^d$ adapted, when the gear 27 is in its neutral position with the lever 33 in its upright position, to register with and form a communication between the ends of the passages 60$^b$ and 60$^c$ whereby the liquid from the pumps will be spilled into the clutch casing. When the shifter rod is moved in either direction the opening 60$^d$ is moved out of communication with the passages 60$^b$ and 60$^c$ and the shifter rod is adapted to close off the former passage so that the liquid from the pump will be directed through the branch 60$^a$ of the feed passage 60 into the valve body 64 as hereinbefore described.

The spring 76 hereinbefore mentioned engages the lower end of the plunger 65 and the lower end of a pocket 85 carried by the valve body 64, this pocket and the lower end of the valve body are adapted to be drained by means of a relief opening 86 communicating therewith and with the clutch casing. The liquid drained into this casing from the various relief openings hereinbefore described, is transferred to the transmission casing 4 as follows. A channel shaped trough 87 is curved to lie adjacent the teeth on the flywheel or clutch member 6 so that the rotation of the latter will form a splash feed and carry the liquid up the trough which is provided with a lateral portion 87$^a$ leading into a duct 88 which communicates with the two casings above the level of the liquid.

The plunger 65 is actuated by means of the pedal lever 63 which is secured to a sleeve 89 rotatably mounted on the transverse shaft 34, the lever being provided with a lateral projection 90 adapted to engage the upper surface of the plunger (see Figs. 1, 3, 4 and 7). To vertically adjust the upward movement of the plunger relative to the valve body 64 so that the slots 66 will normally register with the port $h^{15}$, a bolt 91 having a pivotal connection with the casing 4 is provided (see Figs. 1, 3 and 13). The lever is provided with a laterally extending boss 92 on which is rotatably mounted a sleeve 93, forming a bearing surface for the boss, these parts being formed with openings adapted for the passage of a sleeve 94 therethrough. The sleeve is disposed on the bolt 91 and is provided with a flange or washer on its upper end adapted to engage the upper side of the sleeve 93. A nut threaded on the upper end of the bolt engages this flange and limits the upward movement of the lever and thus the plunger. To assist the spring 76 in raising the pedal lever I provide a compression spring 95 which engages the flange of a flanged collar 96 slidably mounted on the sleeve 94, and a nut 97 threaded on the lower end of the bolt 91. This flanged collar engages the underside of the sleeve 93 whereby the spring tends to maintain the lever in its raised position. From this it follows that as the lever is depressed the springs 76 and 95 are compressed and to indicate to the operator when the plunger 65 has been depressed into neutral position in the valve body, with the slots 66 below the port $l^{15}$, a spring 98 is provided. This spring engages a nut 99 threaded on the lower end of the bolt and a collar 100 slidable on the bolt, the collar normally engages the lower end of the sleeve 94 and is adapted to be engaged by the collar 96 when the lever is depressed a sufficient distance whereby the spring 98 is "picked up" just before the collar 75 closes off the groove $b^1$ to apply the brakes as hereinbefore described.

Figure 7:
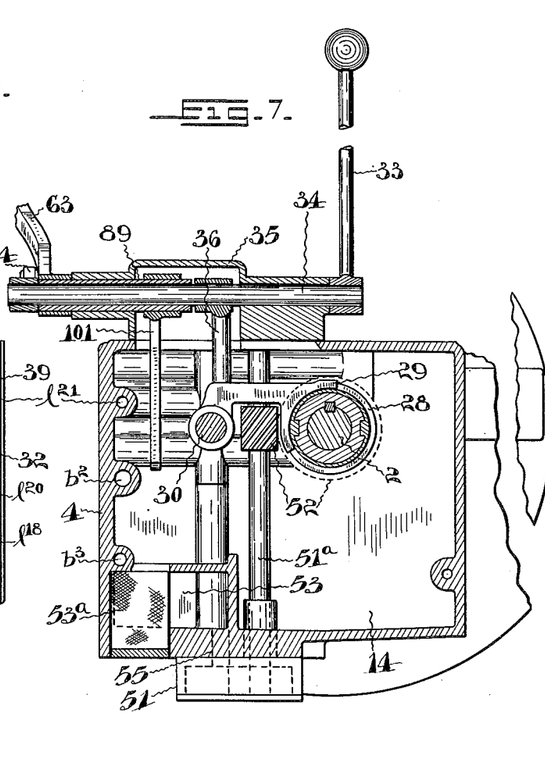
Fig. 7 a cross section on the line 7—7 in Fig. 6.

To give an indication to the operator when the plunger 65 has been depressed into intermediate or low gear positions a depending finger 101 is provided which is secured to the sleeve 89 on which the pedal lever 63 is secured (see Figs. 3 and 7). On the lower end of this finger are formed a pair of slight projections over which an anti-friction roller, carried by the arm 102, is adapted to pass when the slots 66 in the plunger are being moved from the port $h^{15}$ to the port $i^{15}$, and from the latter to the port $l^{15}$ or vice versa. The arm 102 is engaged by a spring 103 which maintains the roller in engagement with the lower end of the finger whereby a "click" is made when the pedal lever is moved and the projections swing the arm to allow the spring to return the roller against the lower end of the finger.

To prevent the plunger 65 being moved to either the high gear or intermediate gear positions while the vehicle is travelling in a reverse direction I provide an arm 104 (see Figs. 1, 3 and 7). This arm is secured to the operating lever shaft 34 and is adapted by engaging a stop on the lever 63 to limit the upward movement of the latter when the lever 33 is in its "reverse" position indicated at R in Fig. 2. Preferably the stop is formed as an adjustable screw threaded in the lug 105 formed on the side of the lever 63 and is adapted to prevent the slots 66 in the plunger 65 from registering with the intermediate or high gear ports $i^{15}$ and $h^{15}$ respectively.

The journals mounted in the bearing 13 are oiled by a passage 106 communicating therewith and with the passage 58, the passage being restricted by means of a plug 107 having a small opening therethrough.

Assuming the engine is running and the lever 33 in neutral position and it is desired to drive the vehicle in high gear the mode of operation is as follows. The pedal lever 63 is first pushed down to the neutral or brake position, indicated in Fig. 2, which is determined by the feel of the operator's foot when the spring 98 is picked up and then the lever 33 is pulled rearwardly to shift the shifter rod 30 and mesh the gears 27 and 24 and to also close off the branch 60ª of the liquid supply passage 60 and cause the latter to supply the plunger 65 with liquid. The pedal lever is now gently released to permit the springs 95 and 76 to move the lever and the plunger 65 upwardly and thus bring the latter into its position for driving the vehicle in low gear in which position it is held until the vehicle moves off. The next step is to further release the foot pedal to permit the plunger to rise to its position for driving in intermediate gear and this position is indicated by the "click" device hereinbefore described. The foot pedal is fully released to allow the plunger to rise into high gear position and the plunger is normally maintained in this position by the springs 76 and 95 holding the lever against the flanged sleeve 94 as hereinbefore described. Assuming it is desired to apply the brake the pedal lever is pushed down to depress the plunger past the intermediate and low gear positions, and the neutral position where the lever picks up the spring 98 and into the position for cutting off the supply of liquid to the brake cylinder. To reverse the direction of the vehicle the plunger 65 is first held in neutral or brake position and the lever 33 shifted to its reverse position and then the plunger is released into low gear position where it is held from further upward movement by the arm 104 as hereinbefore described.

What I claim is:—

1. The combination of a driving element; a driven element; a countershaft having a driving connection with said driven element and having a gear journalled thereon; a change speed pinion meshed with said gear; a composite clutch for connecting said driving and driven elements and controlling the operation of said gear; means for forming a drive connection between said gear and countershaft; means tending to normally disengage said drive connecting means; and means including a single actuating device adapted to either simultaneously actuate the clutch and the drive connecting means to form a driving connection between the change speed gear and the driving element and between the countershaft and the said gear thereon or to actuate the clutch to connect the driving and driven elements.

2. The combination of a driving element; a driven element; a countershaft having a driving connection with said driven element; change speed gearing including a plurality of gears journalled on the countershaft; means for forming a drive connection between any one of said gears and the countershaft; a composite clutch for controlling the operation of said gearing and for connecting the driving and driven elements; and means including a single actuating device adapted to successively operate the different portions of the clutch and to actuate the drive connecting means simultaneously with a corresponding portion of the clutch to give the corresponding gear on the countershaft a driving connection with the countershaft.

3. The combination with a brake, of a driving element; a driven element; a set of speed change gears; a composite clutch for controlling the operation of said set of gears and for connecting said driving and driven elements; means for applying the brake; and means including a single actuating device adapted to successively operate the different portions of the clutch and adapted to operate the brake applying means.

4. The combination with a brake, of a driving element; a driven element; a set of speed change gears; a composite clutch for controlling the operation of said set of gears and for connecting said driving and driven elements; means tending to automatically apply the brake; and means including a single actuating device adapted to successively operate the different portions of the clutch and control the brake applying means.

5. The combination with a brake, of a driving element; a driven element; a set of speed change gears; a composite clutch for controlling the operation of said set of gears and for connecting said driving and driven elements; spring means tending to apply the brake; means for normally maintaining the spring means out of action; and means including a single actuating device adapted to operate the different portions of the clutch and adapted to control the last mentioned means.

6. In a change speed gearing, the combination of a clutch including a driving member; a disk adapted to be driven thereby and having a driving connection with a pinion; a countershaft; a gear journalled on said countershaft and meshed with said pinion; means for forming a driving connection between the gear and the countershaft; a shaft adapted to be suitably driven from the countershaft; and means for supplying fluid under pressure to simultaneously actuate the clutch and the said driving means.

7. The combination of a driving element; a transmission shaft; a plurality of driven elements; a countershaft; speed change gears comprising a pinion on each driven element and a plurality of gears journalled on the countershaft and meshing with said pinions; means for forming a drive connection between any one of the said gears and the countershaft; a fluid operated clutch comprising a plurality of clutch members; a plurality of disks lying between the clutch members, one of the disks being splined and axially movable on each driven element and one on the transmission shaft; a plurality of rings rotatably carried by the clutch members adapted to frictionally engage the disks; and means for supplying fluid under pressure to actuate one of the rings to frictionally engage the disk on the transmission shaft or to actuate any one of the other rings to engage its disk on the driven element simultaneously with a corresponding drive connecting means to give the corresponding gear on the countershaft a driving connection with the countershaft.

8. The combination of a driving element; a plurality of driven elements; speed change gears; a composite clutch for connecting said driving and driven elements and for controlling the operation of said gears; fluid pressure means for actuating the different portions of said clutch; a slide valve for controlling the passage of fluid to said pressure means including a valve body provided with a fluid supply conduit and a relief opening and also with ports for the passage of fluid for the operation of the portions of the clutch; and a plunger adapted to form a communication between the fluid supply conduit and any one of the said ports and having an annular recess adapted to form a communication between the ports and the relief openings.

9. The combination of a driving element; a driven element; speed change gears; a composite clutch for connecting said driving and driven elements and for controlling the operation of said gears; fluid pressure means for actuating the different portions of said clutch; a slide valve for controlling the passage of fluid to said pressure means including a valve body provided with a fluid supply conduit and with relief openings and also with ports for the passage of fluid for the operation of the portions of the clutch; a hollow plunger slidably mounted in the valve body and communicating with said fluid supply conduit and having an opening adapted to be registered with any one of the said ports, the wall of the plunger having an annular recess formed at each side of the opening therein, the recesses being adapted to form communications between the ports and the relief openings.

10. The combination of a driving element; a driven element; speed change gears; a composite clutch for connecting said driving and driven elements and for controlling the operation of said gears; a brake; means for applying the brake; a fluid pressure supply conduit; fluid pressure means for actuating the different portions of said clutch and for operating the brake applying means and including a valve body provided with a relief opening and provided with ports for the passage of fluid for the operation of the parts of the clutch, the valve body also having an annular groove for the passage of fluid for the operation of the brake applying means; and a plunger slidably mounted in the valve body adapted to control the passage of the fluid from the fluid supply conduit into the said ports and annular groove.

11. The combination of a driving element; a driven element; speed change gears; a composite clutch for connecting said driving and driven elements and for controlling the operation of said gears; a brake; means tending to automatically apply the brake; a fluid pressure supply conduit; fluid pressure means adapted to hold the brake out of action and for actuating the different portions of said clutch including a valve body provided with relief openings and provided with ports for the passage of fluid for the operation of the parts of the clutch, the valve body also having an annular groove for the passage of fluid for holding the brake out of action; and a plunger slidably mounted in said body and having a plurality of annular recesses formed therein, one of which normally communicates with the fluid pressure supply conduit and the said annular groove to normally maintain the automatic brake applying means out of action, the plunger also having an opening adapted to be brought into register with any one of the ports, the other recesses being arranged at opposite sides of the said opening and adapted to communicate with the unregistered ports and the relief openings.

12. The combination of a driving element; a driven element; speed change gears; gearing for rotating the driven element in opposite directions by the speed change gears; a lever for positioning the said gearing to drive the driven element in either direction or to disconnect the said gearing and the driven element; a composite clutch for connecting said driving and driven elements and for controlling the operation of said change speed gears; fluid pressure means for actuating the different portions of the said clutch; a slide valve for controlling the passage of fluid to said pressure means including a valve body provided with a fluid supply conduit and with ports for the passage of fluid for the operation of the portions of the clutch; a plunger adapted to form a communication between the fluid supply conduit and any one of the said ports, the said plunger being normally positioned to connect the driving and driven elements; and a spillway communicating with the supply conduit and controlled by the said lever whereby the spillway is opened to relieve the fluid pressure to the portion of the clutch which controls the connection of the said driving and driven elements when the lever is in neutral position.

Signed at Toronto, Canada, this 18th day of July 1923.

MAUNSELL B. JACKSON.